Patented Mar. 17, 1942

2,276,957

UNITED STATES PATENT OFFICE 2,276,957

PROCESS OF MANUFACTURING CYCLO-HEXYL-AMINO DIPHENYLAMINE

Willis A. Gibbons, Montclair, and Frederick M. Lewis, Passaic, N. J., assignors to United States Rubber Company, New York, N. Y., a corporation of New Jersey No Drawing. Application May 10, 1941, Serial No. 392,938

6 Claims. (Cl. 260—576)

This invention relates to an improved process of manufacturing cyclo-hexyl-amino diphenylamine, and particularly para-cyclo-hexyl-amino diphenylamine.

According to the invention N,N'-diphenyl phenylene diamine is reduced with hydrogen in the presence of a suitable catalyst.

The following examples illustrate the invention.

Example 1

Ten grams of N,N'-diphenyl para-phenylene diamine are dissolved in 150 cc. of glacial acetic acid and 0.15 gram of platinum oxide catalyst is added in a suitable bottle. Air is flushed out with hydrogen, and then the bottle is shaken for one hour at a temperature of 120° C., while the contents are subjected to the action of hydrogen at a pressure of 30 lbs./sq. in. When 2600 cc. of hydrogen, corrected to standard temperature and pressure (corresponding to 3 mols per mol of the amine), have been absorbed, the reaction mixture is poured into water. The solid which separates is recrystallized from benzene. A yield of 6.6 gms. of para-cyclo-hexyl-amino diphenylamine (65% of theory), of melting point 119° to 120° C., is obtained. The reaction may be represented as follows:

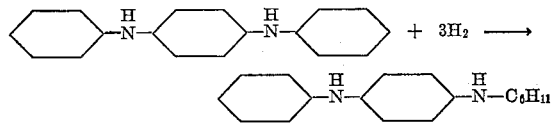

In the low pressure hydrogen method above, in which the hydrogen pressure may be from 10 to 50 lbs./sq. in., temperatures of at least 80–100° C., and preferably in the range of from 100–200° C. should be used. Also, the use of glacial acetic acid as solvent, is recommended, since it was found that poor results follow the use of ethyl alcohol, dioxane and alcohol-ether mixture.

Example 2

400 gms. N,N'-diphenyl para-phenylene diamine are placed in a high pressure cylinder. The air is replaced by hydrogen and then 32 gms. of freshly prepared Raney nickel catalyst (prepared by the method described by Covert and Adkins, J. A. C. S., 54, 4116 (1932)) are added. Hydrogen at a pressure of 2500 lbs./sq. in. is then applied to the cylinder, and the temperature is raised to 195–220° C. The contents of the cylinder are agitated by rocking. Hydrogen is rapidly absorbed. When 9.3 gms. of hydrogen have been absorbed the reaction mixture is allowed to cool and the pressure is released. The product is then dissolved in 2000 cc. of benzene, filtered to remove the catalyst and any unreacted N,N'-diphenyl para-phenylene diamine, and then the benzene is distilled off. The product, para-cyclo-hexyl-amino diphenylamine, melts at 105–120° C. By fractional distillation at a pressure of 0.5 mm. of mercury, material distilling in the range of 190–200° C. is obtained consisting of substantially pure para-cyclo-hexyl-amino diphenylamine of melting point 118–120° C. The yield is from 30 to 50% after deducting unchanged N,N'-diphenyl para-phenylene diamine.

In the high pressure hydrogen process of Example 2 using molten N,N'-diphenyl para-phenylene diamine the reduction temperature should not be below 150° C., and preferably not above 220° C. At temperatures of 235° C. and above the course of the reaction leads to a mixture of products and lower yields. The nickel catalyst, particularly when freshly prepared, is found to be very active. The hydrogen pressure should be from 50–300 atmospheres.

Having thus described our invention, what we claim and desire to protect by Letters Patent is:

1. A method of preparing a cyclo-hexyl-amino diphenylamine which comprises catalytically reducing an N,N'-diphenyl phenylene diamine with hydrogen gas.

2. A method which comprises catalytically reducing N,N'-diphenyl para-phenylene diamine with hydrogen gas under pressure, and subsequently recovering para-cyclo-hexyl-amino diphenylamine.

3. A method which comprises catalytically reducing N,N'-diphenyl para-phenylene diamine in solution with hydrogen gas under a pressure of from 10–50 lbs./sq. in. and at a temperature of from 80–200° C., and subsequently recovering para-cyclo-hexyl-amino diphenylamine.

4. A method which comprises catalytically reducing N,N'-diphenyl para-phenylene diamine in solution in glacial acetic acid with hydrogen gas under a pressure of from 10–50 lbs./sq. in. in the presence of a platinum oxide catalyst and at a temperature of from 80–200° C., and subsequently recovering para-cyclo-hexyl-amino diphenylamine.

5. A method which comprises catalytically reducing molten N,N'-diphenyl para-phenylene diamine with hydrogen gas under a pressure of from 50–300 atmospheres, and subsequently recovering para-cyclo-hexyl-amino diphenylamine.

6. A method which comprises catalytically reducing molten N,N'-diphenyl para-phenylene diamine with hydrogen gas under a pressure of from 50–300 atmospheres, in the presence of a freshly prepared nickel catalyst, and subsequently recovering para-cyclo-hexyl-amino diphenylamine.

WILLIS A. GIBBONS.
FREDERICK M. LEWIS.